US006457122B1

(12) United States Patent
Ramezani (10) Patent No.: US 6,457,122 B1
(45) Date of Patent: Sep. 24, 2002

(54) FAULT TOLERANT PROCESS FOR THE DELIVERY OF PROGRAMS TO WRITEABLE STORAGE DEVICE UTILIZING PRE-OPERATING SYSTEM SOFTWARE/FIRMWARE

(75) Inventor: Mehran Ramezani, Laguna Niguel, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/336,073

(22) Filed: Jun. 18, 1999

(51) Int. Cl.$^7$ ................................................. G06F 9/44

(52) U.S. Cl. .......................................... 713/1; 717/174

(58) Field of Search ............................... 713/1; 717/11, 717/168–178

(56) References Cited

U.S. PATENT DOCUMENTS

| | | |
|---|---|---|
| 5,121,345 A | 6/1992 | Lentz |
| 5,128,995 A | 7/1992 | Arnold et al. |
| 5,131,089 A | 7/1992 | Cole |
| 5,142,680 A | 8/1992 | Ottman et al. |
| 5,146,568 A | 9/1992 | Flaherty et al. |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,418,918 A | 5/1995 | Vander Kamp et al. |
| 5,444,850 A | 8/1995 | Chang |
| 5,448,741 A | 9/1995 | Oka |
| 5,452,454 A | 9/1995 | Basu |
| 5,463,766 A | 10/1995 | Schieve et al. |
| 5,469,573 A | 11/1995 | McGill, III et al. |
| 5,504,905 A | 4/1996 | Cleary et al. |
| 5,513,333 A * | 4/1996 | Kynett et al. ............... 711/103 |
| 5,522,076 A | 5/1996 | Dewa et al. |
| 5,526,523 A | 6/1996 | Staub et al. |
| 5,542,082 A | 7/1996 | Solhjell |
| 5,581,740 A | 12/1996 | Jones |
| 5,586,327 A | 12/1996 | Bealkowski et al. |
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |
| 5,680,547 A | 10/1997 | Chang |
| 5,692,190 A | 11/1997 | Williams |
| 5,694,583 A | 12/1997 | Williams et al. |
| 5,694,600 A | 12/1997 | Khenson et al. |
| 5,701,477 A | 12/1997 | Chejlava, Jr. |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,742,787 A * | 4/1998 | Talreja ........................ 711/103 |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,815,706 A | 9/1998 | Stewart et al. |
| 5,819,063 A | 10/1998 | Dahl et al. |
| 5,828,888 A | 10/1998 | Kozaki et al. |

(List continued on next page.)

Primary Examiner—Thomas M. Heckler (57) ABSTRACT

A method and apparatus for installing programs on a writeable storage device in a fault tolerant manner is described. A processor readable medium having instructions causes a processor to write at least one program to a writeable storage device. A state machine coupled to the processor readable medium indicates the write status of the program to the processor readable medium.

28 Claims, 7 Drawing Sheets

U.S. PATENT DOCUMENTS

| | | |
|---|---|---|
| 5,832,251 A | 11/1998 | Takahashi |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,901,310 A | 5/1999 | Rahman et al. |
| 5,907,679 A | 5/1999 | Hoang et al. |
| 2001/0011318 A1 * | 8/2001 | Dalvi et al. .................. 711/103 |

* cited by examiner

FAULT TOLERANT PROCESS FOR THE DELIVERY OF PROGRAMS TO WRITEABLE STORAGE DEVICE UTILIZING PRE-OPERATING SYSTEM SOFTWARE/FIRMWARE

BACKGROUND

1. Field of the Invention

The present invention generally relates to installing programs in a writeable storage device in a fault tolerant manner.

2. Background

With the advent of the Internet, computers have generally become a gateway to collecting and distributing various information. Improvements generally exist in collecting and distributing information in a more efficient manner. For example, systems generally exist that provide software and services over the Internet at the request of the user. However, various software and services are provided without considering the user's requirements and/or preferences. Consequently, the systems are not optimized for the user's specific needs and/or preferences.

Equally important, even though the systems may be designed to efficiently collect and distribute information, if the user's computer is not reliable in receiving the information, the efficiency is compromised. Consequently, there is a need for the user's computer to receive information in a fault tolerant manner such that the systems can collect and distribute information in an optimal manner.

SUMMARY

A method and apparatus for installing programs on a writeable storage device in a fault tolerant manner is described. A processor readable medium having instructions causes a processor to write at least one program to a writeable storage device. A state machine coupled to the processor readable medium indicates the write status of the program to the processor readable medium.

Additional features, embodiments, and benefits will be evident in view of the figures and detailed description presented herein.

DETAILED DESCRIPTION

A method and apparatus that installs programs on a writeable storage device in a fault tolerant manner is described. According to one embodiment of the invention, there is a mechanism of delivering information and/or services from pre-operating system time domain to operating system controlled environment. There is a need to define this mechanism in a fault tolerant manner. In one embodiment, a system firmware installs programs in the writeable storage device that may be the hard disk drive. In another example, the writeable storage device may be a non-volatile memory such as flash memory. The firmware, in conjunction with a state machine, controls and determines the delivery of the programs to the writeable storage device in a fault tolerant manner. Various examples and embodiments will now be described to aid in the understanding of the invention. These examples and embodiments should not be construed as limitations to the scope of the invention.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins.

OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

Figure 1:
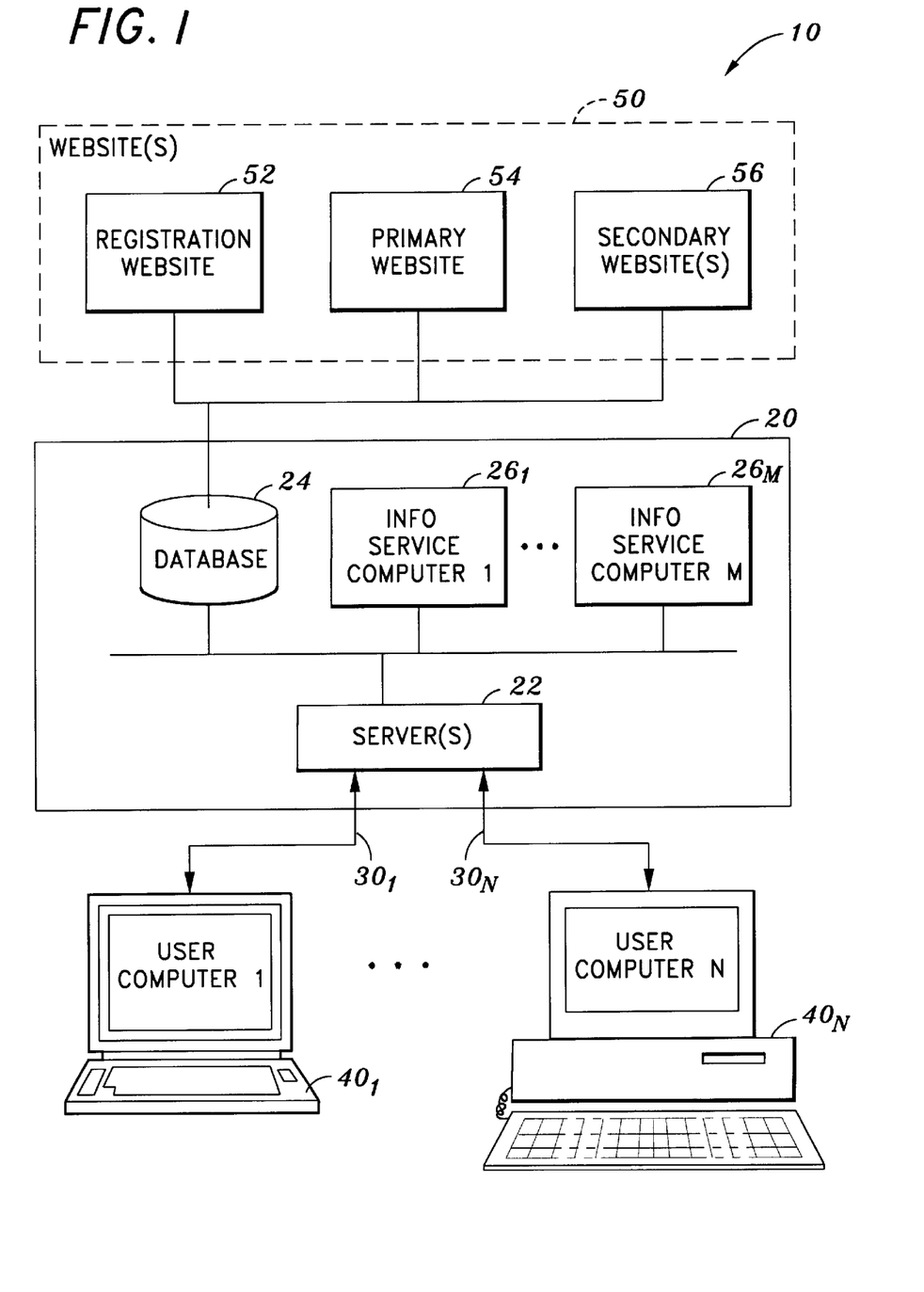
FIG. 1 system block diagram of one embodiment of an information distribution system in which the apparatus and method of the invention is used.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), that will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289. Entitled "Method and Apparatus Automatically Installing and Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1 14_{40N}$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers is used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
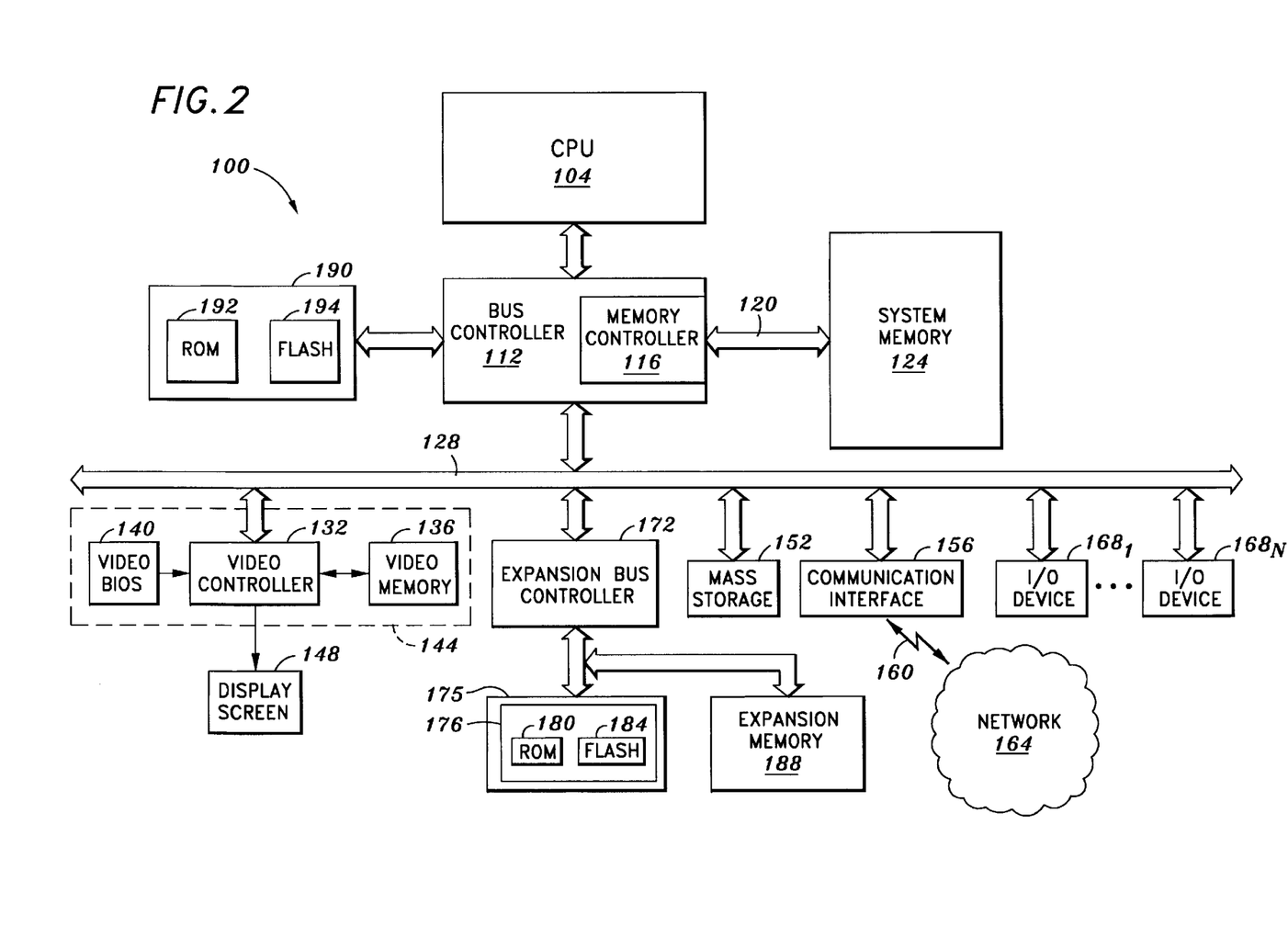
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems $40_1-40_N$ and/or computers $26_1-26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1-168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1-168_N$ include a keyboard, mouse, audio/sound card, printer, and the like. The I/O device $168_1-168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable drive, a low capacity media device, and/or any combination thereof. The expansion bus controller 172 is coupled to nonvolatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88a, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84, ISUA 86, and initial payload 88*a* may each be separately developed and stored in the system firmware 176 prior to initial use of the computer system 100. In one embodiment, the RAPI 84, ISUA 86, and initial payload 88*a* each includes proprietary software developed by Phoenix Technologies, Ltd. RAPI 84 provides a secure interface between ROM application programs and system firmware 176. One embodiment of RAPI 84 is described in co-pending U.S, patent application Ser. No. 09/336,889 entitled "System and Method for Securely Utilizing Basic. Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289 entitled "Method and Apparatus for Automatically Installing and Configuring Software on a Computer," filed on Jun. 18, 1999, assigned to Phoenix Technologies, Ltd., and which is incorporated herein by reference.

Figure 3:
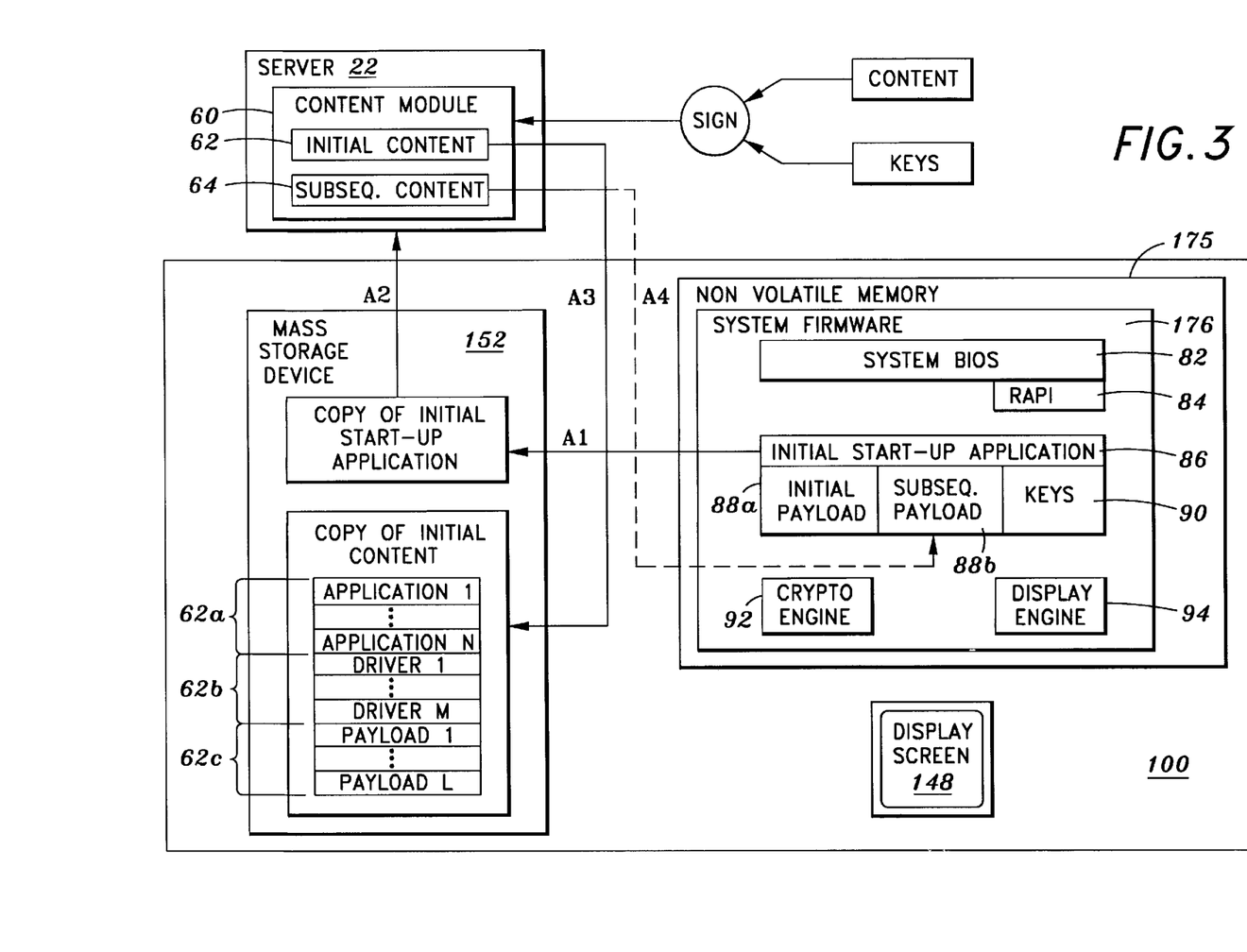
FIG. 3 illustrates a logical diagram of one embodiment of the invention.
Figure 4A:
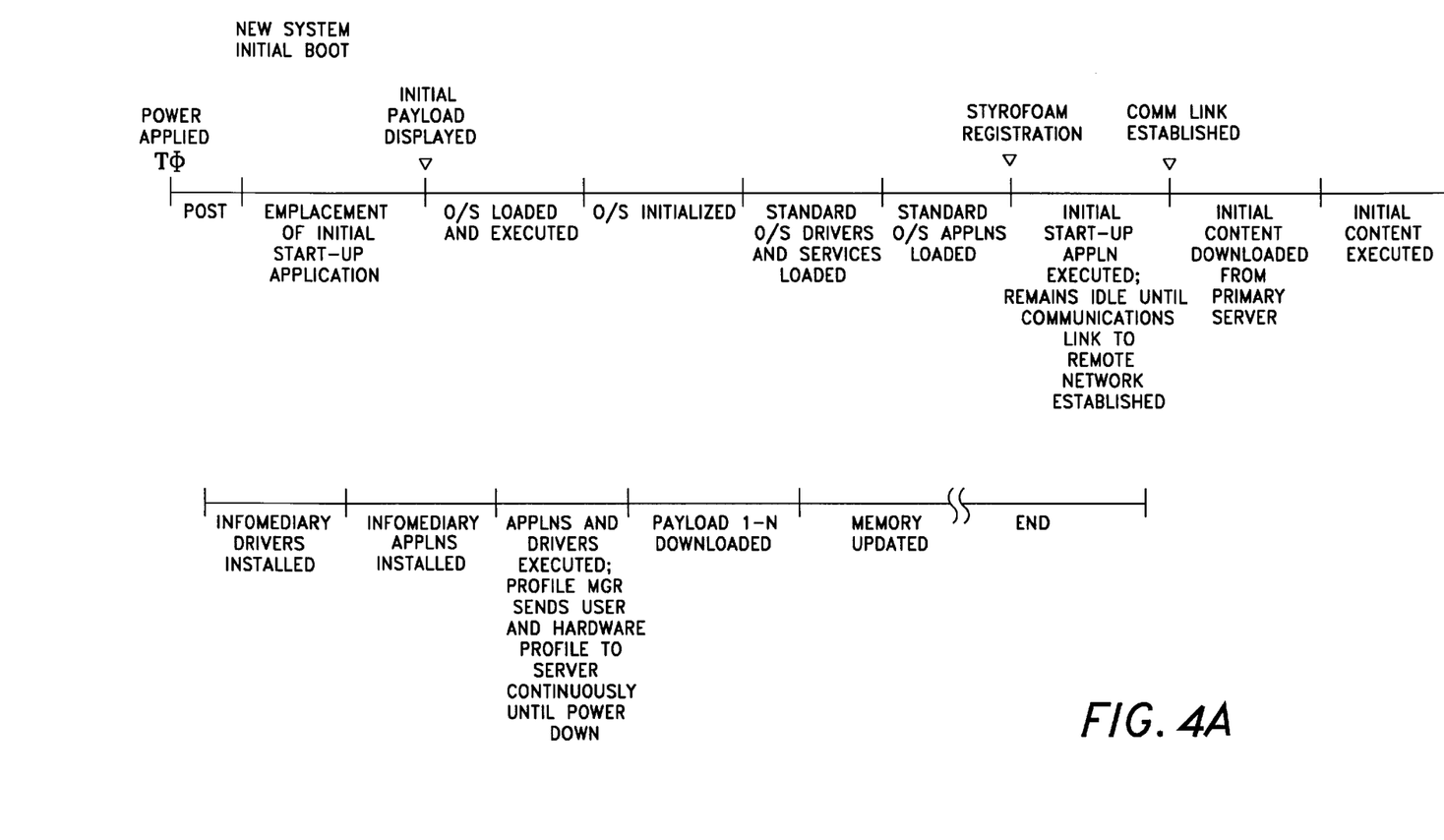
FIGS. 4a and 4b illustrate one embodiment of a process flow chart provided in accordance with the principles of the invention.
Figure 4B:
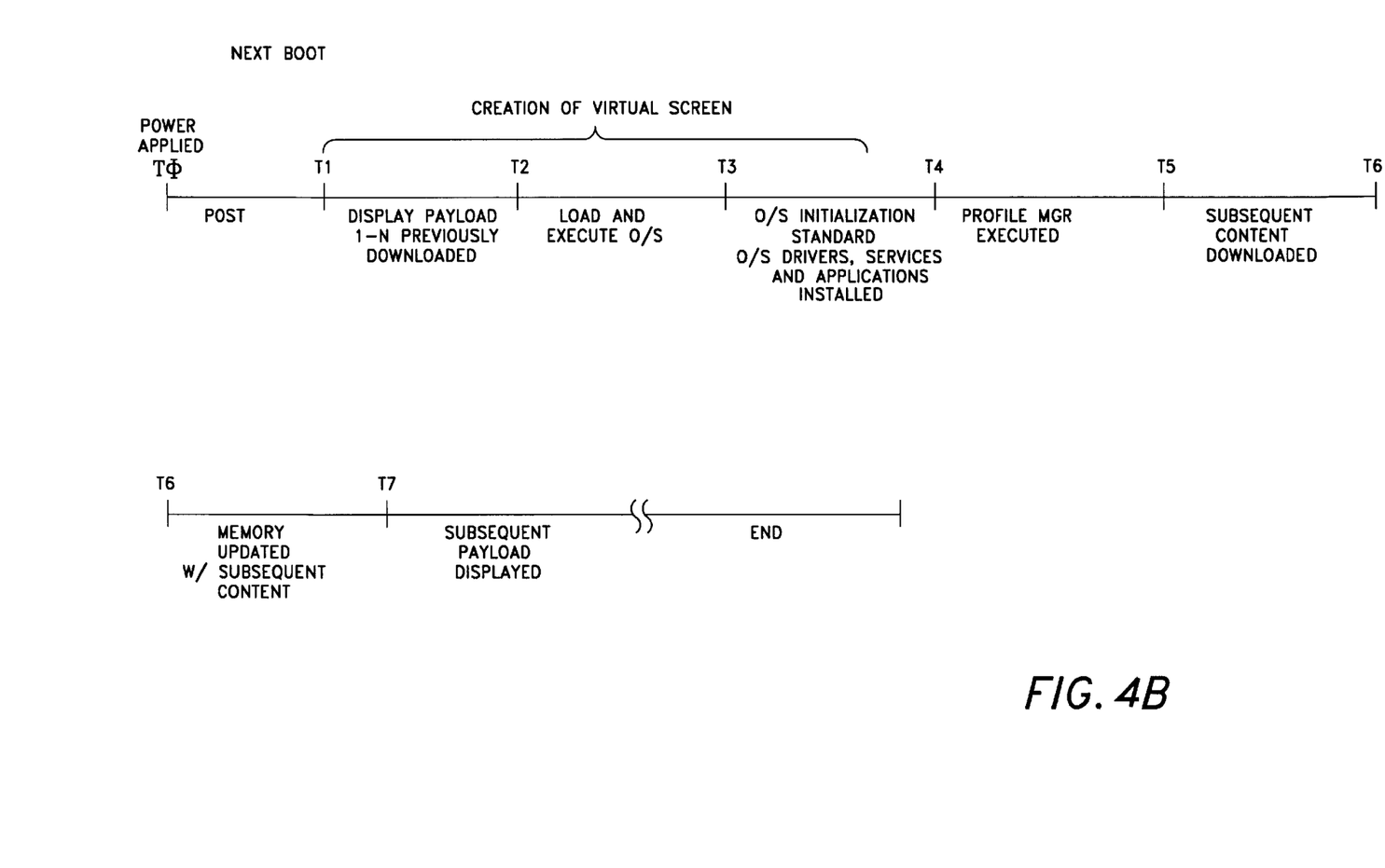

In one embodiment, as shown in FIGS. 3 and 4A and 4B, after power is initially turned on to a new computer system 100, the system commences with POST procedures. During the initial POST, the ISUA 86 is transferred to the symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100 in which the system firmware 176 is configured to install programs to a writeable storage device in a fault tolerant manner. In one embodiment, the writeable storage device may be the mass storage device 152. Referring to FIGS. 2 and 3, the mass storage device 152, as shown by Al by the system firmware 176. Because the operation of the system firmware 176 ends with the boot up of the OS, the system firmware 176 is not able to confirm that the ISUA 86 has been successfully transferred and is operational. This is because the operation of the ISUA 86 occurs during OS control of the system. Thus, the transfer of ISUA 86 is facilitated by the system firmware 176 in conjunction with the state machine 96 which keeps track of the ISUA 86 status.

In one embodiment, the state of the state machine 96 may be stored in a non-volatile memory such as the flash memory. The various states of the state machine 96 indicate the transfer status of the ISUA 86. During POST, the state indicating the particular transfer status is preserved in the non-volatile memory. Thus, in a subsequent POST, by interrogating the state of the state machine 96, the system firmware 176 is able to keep track of the ISUA 86 transfer status. Based on the status of the state machine 96, system firmware 176 is able to perform the proper execution for the transfer of the ISUA 86 to the mass storage device 152. Consequently, the system firmware 176 is able to make a controlled delivery of the ISUA 86 in a fault tolerant manner. Below is a table that defines the states of the state machine in accordance with an embodiment of the invention. Further details of the state machine will be described with reference to FIGS. 5 and 6.

| Flag. | State of the "Delivery" |
|---|---|
| 111 | User/System Vendor has disabled the delivery. There will be a "NAG" feature to make sure that the user has not changed his/her mind. |
| 000 (default) | System is ready to deliver, but delivery has not happened yet. |
| 001 | Delivery has been attempted. Program has not been executed properly yet. If remained in this condition for more than a predetermined time period (e.g., 15 days), attempt state "100" |
| 010 | Delivery has been acknowledged by the execution of the program which among other responsibility will signal the system firmware of the completion of the process. Go to the state 001 after a predetermined time period (e.g., 15 days) (this assures that the subsequent reloading of OS will not erase the program) |
| 100 | If in this state for more than a predefined time period, remind the user to execute the program manually, by printing a message on the Boot Screen |
| 101 | Reserved |
| 011 | Reserved |
| 110 | Reserved |

In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88*a* to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067, entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-Based Device Emulation" filed on Mar. 19, 1999, in co-pending U.S. Patent Continuation-in-Part application Ser. No. 09/336,307, entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users that have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images During Boot-Up and Shut-Down" filed on Jun. 18, 1999, which is assigned to Phoenix Technologies, Ltd., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

Figure 5:
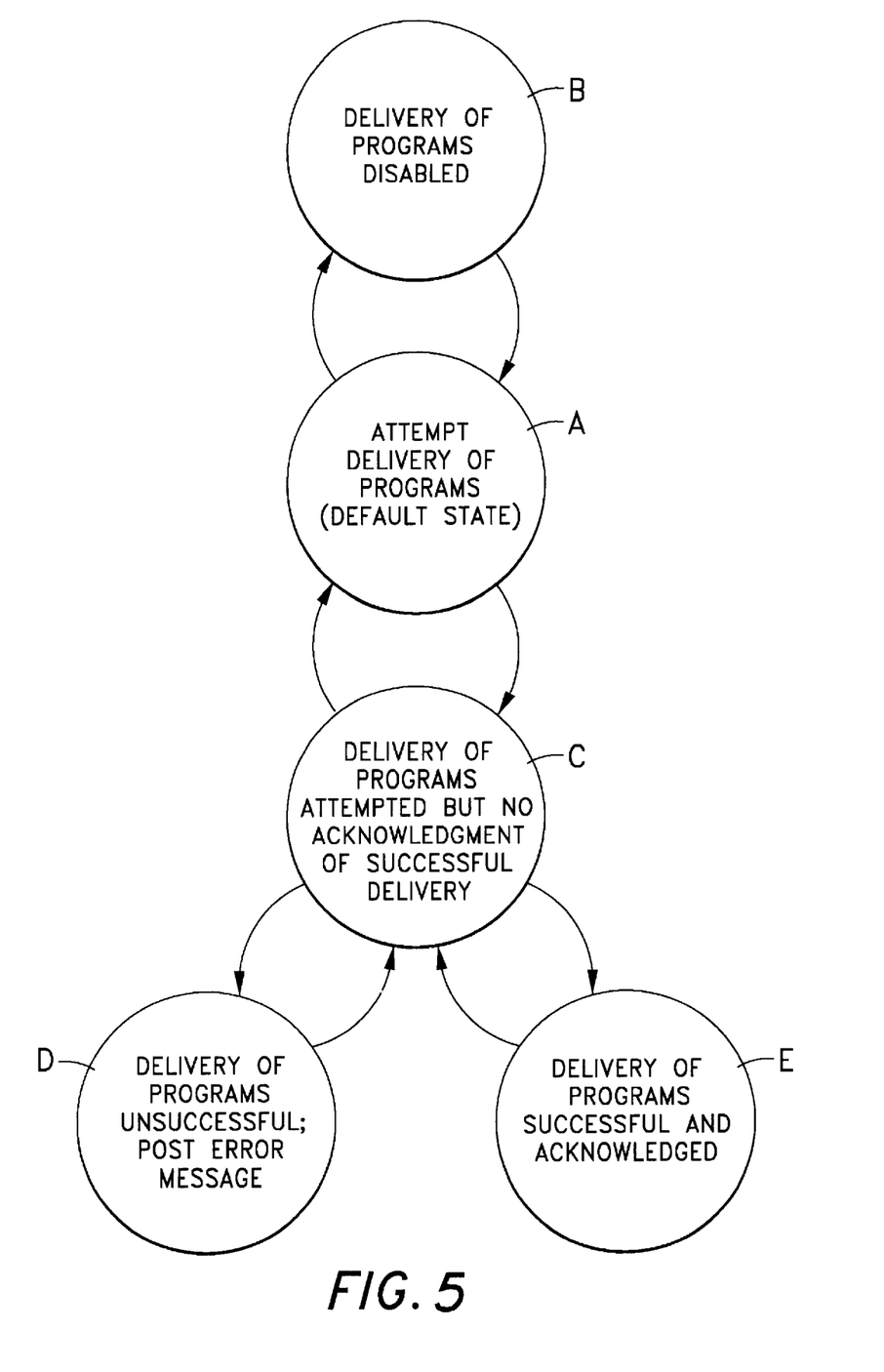
FIG. 5 is a state diagram of the state machine in accordance with an embodiment of the invention.

FIG. 5 is a state diagram of a state machine in accordance with one embodiment of the invention. At the initiation of the state machine which in one example is the initial POST, the firmware causes the state machine to transition to state A indicating the system is ready to deliver programs to a writeable storage device. In the subsequent POST, The firmware determines whether the delivery of the programs has been enabled. Because the state of the state machine is stored in a non-volatile memory, the firmware "remembers" the program transfer status from the previous POST by interrogating the state of the state machine. If the delivery has not been enabled, the firmware causes the state machine to transition to state B. The disablement may be caused by the source of the programs preventing the delivery in one example. In another example, the user has affirmatively indicated that the user does not desire to have the installation. The disablement may be stored in a register or file that is checked by the firmware. The firmware performs no further operation to deliver the programs.

The state machine remains in state B until the delivery is enabled at which time in the next POST, the enablement is detected and the firmware causes the state machine to transition back to state A. Once, the enablement of the delivery has been detected, the firmware attempts delivery of the programs to the writeable storage device. At this point, the firmware causes the state machine to transition to state C. If the delivery has not been properly executed, the state machine remains in state C. In the subsequent POSTs, if the firmware detects the state as state C, the firmware makes further attempt to deliver the programs to the writeable storage device. If the state machine remains at state C for a predetermined time period or after a number of tries, the firmware causes the state machine to transition to state D which is detected by the firmware in the next POST routine.

In the next POST, if the firmware detects state D, the firmware alerts the user that an error has occurred. In one embodiment, the firmware instructs the user to install the program manually.

In the case where the delivery has been successfully executed, the firmware receives acknowledgment of the successfully delivered programs that causes the state machine to transition to state E. In one embodiment, one of the executed programs transmits an acknowledgement signal which is stored in a file or register in a non-volatile memory. The firmware on detecting the acknowledgment signal causes the state machine to change to state E. After a predetermined period of time in state E, the firmware causes the state machine to transition to state C. At state C, the firmware detects for the acknowledgment signal of the successfully executed program. Otherwise, the firmware attempts delivery of the programs. This assures that subsequent reloading of the operating system does not erase the programs stored in the writeable storage device.

Figure 6:
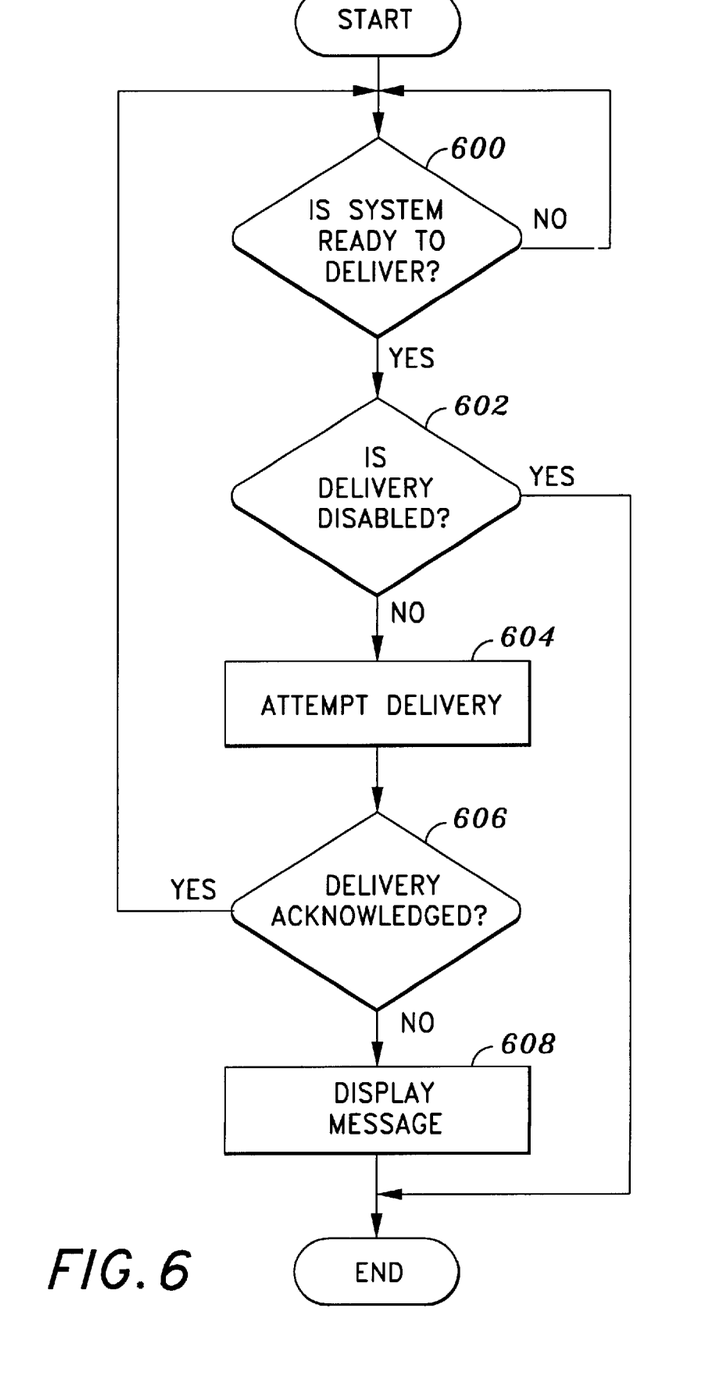
FIG. 6 is a flow chart that shows the steps of installing programs in a fault tolerant manner in accordance with an embodiment of the invention.

FIG. 6 is a flow chart showing the steps of installing programs in a fault tolerant manner in accordance with one embodiment of the invention. At block 600, an inquiry is made as to whether the system is ready to deliver the programs to a writeable storage device. If the system is not ready, the delivery is suspended until the system is ready to deliver. At block 602, an inquiry is made as to whether the delivery of the programs has been disabled. If the delivery of the programs has been disabled, then further execution of the flow chart is halted until enabled. If the delivery of the programs has been enabled, then at block 604, a delivery is attempted. At block 606, an inquiry is made as to whether the delivery of the programs has been successful. If the delivery was unsuccessful then at block 608 a message is displayed to alert the failure of the delivery. Otherwise, the flow chart reverts to block 600 to repeat the process.

A fault tolerant process of delivery of programs to a writeable storage device by a software/firmware has been described. Because the state machine keeps track of the delivery status of the programs, the software/firmware is able to perform the proper execution for a controlled delivery of the programs. Many advantages are realized from the controlled delivery. For example, the user has an uninterrupted access to the programs that enable connection to information in accordance to the user's specific needs and/or preferences. Moreover, even though the programs have been accidentally erased from the writeable storage device, the programs are automatically recovered by the software/firmware. The software/firmware continuous monitors the status of the programs to ensure the programs are available for usage by the user.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense.

What is claimed is:

1. An apparatus comprising:
   a processor readable medium having instructions which cause a processor to write at least one program to a writeable storage device during a first pre-operating system interval; and
   a state machine coupled to said processor readable medium, wherein said state machine is configured to indicate a write status of said program to said processor readable medium during a second pre-operating system interval.

2. The apparatus of claim 1, wherein, after said first pre-operating system interval and upon successful execution, said program provides an acknowledgement to a non-volatile memory, said processor readable medium to further have instructions to cause said state machine to change states in response to said acknowledgement.

3. The apparatus of claim 1, wherein said writeable storage device is one of a hard drive, a floppy drive, and a CD-ROM.

4. The apparatus of claim 1, wherein said second pre-operating system interval occurs subsequently to said first pre-operating system interval.

5. An apparatus as in claim 1, wherein a state of said state machine is stored in a non-volatile memory.

6. An apparatus as in claim 5, wherein in a first state of said state machine, said processor readable medium is configured to disable writing said program to said writeable storage device.

7. An apparatus as in claim 5, wherein in a second state of said state machine, said processor readable medium is configured to write said program to said writeable storage device.

8. An apparatus as in claim 5, wherein in a third state of said state machine, said processor readable medium is configured to re-attempt writing said program to said writeable storage device.

9. An apparatus as in claim 5, wherein in a fourth state of said state machine, said processor readable medium is configured to display an error message on a display.

10. A method for writing at least one program to a writeable storage device, said method comprising:
   storing a state from a plurality of states in a memory indicative of a write status in a first pre-operating system interval;
   reading said state in said memory in a second pre-operating system interval; and
   performing a function based on said state.

11. The method of claim 10, further comprising:
   executing said at least one program;
   providing an acknowledgement from said at least one program to a non-volatile memory, said acknowledgement to indicate that said at least one program executed successfully; and
   changing said state in response to said acknowledgement.

12. The method of claim 10, wherein said writeable storage device is one of a hard drive, a floppy drive, and a CD-ROM.

13. The method of claim 10, wherein said second pre-operating system interval occurs subsequently to said first pre-operating system interval.

14. A method as in claim 10, wherein performing said function based on said state further comprises:
   if said state from said plurality of states is a first state, then disabling writing said program to said writeable storage device;
   if said state from said plurality of states is a second state, then writing said program to said writeable storage device;
   if said state from said plurality of states is a third state, then re-writing said program to said writeable storage device;
   if said state from said plurality of states is a fourth state, then displaying an error message on a display; and
   if said state from said plurality of states is a fifth state, then transitioning to said second state after an occurrence of a predetermined event.

15. A method as in claim 14, wherein said predetermined event is a predetermined period of time.

16. A method as in claim 14, wherein said predetermined event is a predetermined number of occurrence of pre-operating system intervals.

17. A processor readable medium having stored thereon data representing a sequence of instructions, which when executed by a processor causes said processor to perform a method comprising:
   storing a state from a plurality of states in a memory indicative of a write status of at least one program to a writeable storage device in a first pre-operating system interval;
   reading said state in said memory in a second pre-operating system interval; and
   performing a function based on said state.

18. A processor readable medium as in claim 17, wherein performing said function based on said state further comprises:
   if said state from said plurality of states is a first state, then disabling writing said program to said writeable storage device;
   if said state from said plurality of states is a second state, then writing said program to said writeable storage device;
   if said state from said plurality of states is a third state, then re-writing said program to said writeable storage device;
   if said state from said plurality of states is a fourth state, then displaying an error message on a display; and
   if said state from said plurality of states is a fifth state, then transitioning to said second state after an occurrence of a predetermined event.

19. A processor readable medium as in claim 18, wherein said predetermined event is a predetermined period of time.

20. A processor readable medium as in claim 18, wherein said predetermined event is a predetermined number of occurrence of pre-operating system intervals.

21. A system, comprising:
   a processor;
   a processor readable medium having one or more instructions which cause said processor to write at least one program to a writeable storage device during a first pre-operating system interval; and
   a state machine coupled to said processor readable medium, wherein said state machine is configured to indicate a write status of said program to said processor readable medium during a second pre-operating system interval.

22. A system as in claim 19, wherein a state of said state machine is stored in a non-volatile memory.

23. A system as in claim 21, wherein in a first state of said state machine, said processor readable medium is configured to disable writing said program to said writeable storage device.

24. A system as in claim 21, wherein in a second state of said state machine, said processor readable medium is configured to write said program to said writeable storage device.

25. A system as in claim 21, wherein in a third state of said state machine, said processor readable medium is configured to re-attempt writing said program to said writeable storage device.

26. A system as in claim 21, wherein in a fourth state of said state machine, said processor readable medium is configured to display an error message on a display.

27. A computer data signal embodied in a carrier wave comprising:
   a first code segment configured to store a state from a plurality of states in a memory indicative of a write status in a first pre-operating system interval;

a second code segment configured to read said state in memory in second pre-operating system interval; and a third code segment configured to perform a function based on said state.

28. A computer data signal as in claim 27, wherein performing said function based on said state further comprises:

if said state from said plurality of states is a first state, then a fourth code segment configured to disable writing said program to said writable storage device;

if said state from said plurality of states is a second state, then a fifth code segment configured to write said program to said writeable storage device;

if said state from said plurality of states is a third state, then a sixth code segment configured to re-write said program to said writeable storage device;

if said state from said plurality of states is a fourth state, then a seventh code segment configured to display and error message on a display; and if said state from said plurality of states is a fifth state, then an eighth code segment configured to transition to said second state after an occurrence of a predetermined event.

* * * * *